United States Patent
Yang (10) Patent No.: US 9,570,728 B2
(45) Date of Patent: *Feb. 14, 2017

(54) ELECTRICITY SUPPLY ELEMENT AND CERAMIC SEPARATOR THEREOF

(71) Applicant: Prologium Holding Inc., Grand Cayman (KY)

(72) Inventor: Szu-Nan Yang, Taipei (TW)

(73) Assignee: PROLOGIUM HOLDING INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,961

(22) Filed: Sep. 9, 2015

(65) Prior Publication Data

US 2015/0380704 A1 Dec. 31, 2015

Related U.S. Application Data

(63) Continuation of application No. 13/740,177, filed on Jan. 12, 2013, now Pat. No. 9,231,239, which is a continuation-in-part of application No. 13/323,825, filed on Dec. 13, 2011, now Pat. No. 8,974,945, which is a continuation-in-part of application No. 11/755,657, filed on May 30, 2007, now abandoned.

(51) Int. Cl.
*H01M 2/16* (2006.01)
*H01M 10/052* (2010.01)

(52) U.S. Cl.
CPC ........... *H01M 2/166* (2013.01); *H01M 10/052* (2013.01)

(58) Field of Classification Search
CPC ....... H01M 2/16; H01M 2/1646; H01M 2/166
See application file for complete search history.

(56) References Cited

U.S. PATENT DOCUMENTS

| 9,231,239 | B2 * | 1/2016 | Yang | H01M 2/166 |
| 2003/0099885 | A1 * | 5/2003 | Kim | H01M 4/13 429/241 |
| 2007/0009803 | A1 * | 1/2007 | Kim | H01M 2/145 429/251 |
| 2010/0233547 | A1 * | 9/2010 | Baba | H01M 2/166 429/246 |

* cited by examiner

*Primary Examiner* — Patrick Ryan
*Assistant Examiner* — Julian Anthony (57) ABSTRACT

An electricity supply element and the ceramic separator thereof are provided. The ceramic separator is adapted to separate two electrode layers of the electricity supply element for permitting ion migration and electrical separation. The ceramic separator is made of ceramic particulates and the adhesive. The adhesive employs dual binder system, which includes linear polymer and cross-linking polymer. The adhesion and heat tolerance are enhanced by the characteristic of the two type of polymers. The respective position of the two electrode layers are maintained during high operation temperature to improve the stability, and battery performance. Also, the ceramic separator enhances the ion conductivity and reduces the possibility of the micro-short to increase practical utilization.

10 Claims, 6 Drawing Sheets

ELECTRICITY SUPPLY ELEMENT AND CERAMIC SEPARATOR THEREOF

RELATED-APPLICATIONS

This application is a continuation of the U.S. patent application Ser. No. 13/740,177, filed Jan. 12, 2013, which is continuation-in-part of U.S. patent application Ser. No. 13/323,825, filed Dec. 13, 2011, which is a continuation-in-part of U.S. patent application Ser. No. 11/755,657, filed May 30, 2007. This application claims priority to all the above-referenced applications. The claims 1 and 8 of the instant application correspond to claims 1 and 22 respectively of the parent application of Ser. No. 13/740,177. Claims 5 and 26 in the parent application of Ser. No. 13/740,177 are incorporated into claims 1 and 8 of the instant application.

FIELD OF INVENTION

The present invention relates to an electricity supply element, in particular to an electricity supply element having a ceramic separator to enhance heat tolerance and the ion conductivity.

RELATED ART

The separator (film) is an important unit of an lithium battery. The separator is disposed between the positive electrode layer and the negative electrode layer. The separators are used to electrically insulate the negative and positive electrode layers so that the battery electrolyte forms the only ionically conducting path therebetween. In order for the separators to provide this insulating function, the separators must exhibit a low electrical resistance, must be chemically stable in the electrolyte environment, must resist stiffening and cracking, must be wettable to the battery electrolyte, and must limit active material transport.

The microporous polyolefin film, such as PE or PP, is widely used to manufacture battery separators because it is chemically stable and outstanding in physical properties. The melting point of the PE is about 130° C., and the melting point of the PP is about 160° C. Limited thermal and mechanical stability of the polymer separator may lead to overheating of the battery and explosion caused by separators melting and rupturing. Thermal operation window of separator in a battery is determined by shutdown temperature and melt down temperature. Therefore, in recent years, ceramic separators with high thermal stability and good wettability are developed.

There are two types of the ceramic separator. The first type is used the ceramic particles as the main material of the separator to replace the polyolefin, such as U.S. Pat. No. 5,342,709. The second type is utilized the ceramic particles to be coated on a film made of PET, PEN or PI, such as US patent application publication no. 2008/0138700.

For the first type, the ceramic particles of the separator are bonded with the electrode layer by the adhesive. The binder system of the adhesive is similar to the binder system of the electrode layers. Therefore, the solvent systems are also similar. When drying the solvent after coating, the particles rearrangement and the adhesive entanglement are occurred and the holes are produced in the bulk and at the interfaces. The holes would be a good path for ion mobility. However, due to the solvent is removed in a short time, the holes may be huge to induce micro-short. Therefore, the electrical insulation of the electrodes in battery will be compromised.

For the second type, the adhesive, such as Polyvinylidene fluoride (PVDF) or PVDF-HFP, is used to bind the ceramic particles on the surface of a substrate film. Moreover, the film has holes to permit the ion migration. The ceramic particles are coated on the substrate film meant to ensure the electrical insulation of the electrodes at abnormal conditions. However, the adhesion between the PVDF or PVDF-HFP, and material of the substrate film, such as PET, PEN or PI, is weak, and the ceramic particles are easy to peel off. To increase the particle's adhesion to the substrate film, the percentage of the adhesive has to be higher. However, the ion conductivity would be lowered accordingly.

Also, if the amount of the ceramic particles is raised to enhance the ion conductivity, the amount of the adhesive also has to be raised accordingly to maintain enough adhesion. Therefore, the percentage of the ceramic particles is limited, only 40% at most. The ion conductivity is limited. To increase the ion conductivity, the plasticizer or non-solvent are added into the adhesive. After the formation of the separator film, the plasticizer or non-solvent is removed to obtain holes for ion mobility to enhance the ion conductivity.

Furthermore, the ceramic particles may easily absorb water, which will significantly deteriorate battery performance. To remove the absorbed water of the ceramic particles, it has to be heated at a temperature over 190° C. However, the melting point of the adhesive is not high enough. For example, the melting point of the PVDF is about 170° C., and the melting point of the PVDF-HEP is about 120-150° C. When the separator is heated at 190° C., the adhesive would melt. The distribution of the holes within the separator would be changed to worsen the electric property of the battery. Even adding the plasticizer or non-solvent as above mentioned, the holes would be refilled by the molten adhesive to lower the ion conductivity.

On the other hand, if the materials of the adhesive with high heat tolerance are used, such as epoxy resin, acrylic acid resin, polyacrylonitrile (PAN), the thermal stability and the adhesion will be improved. However, these materials would form such cross-linking network with dense structure which significantly reduces ion migration and final battery performance. In other words, the distribution of the holes is not suitable for ion migration. Therefore, the ion conductivity is very low.

It is noted that the reference cited in parent application of Ser. No. 13/740,177, Baba et al. (US 2010/0233547), shows that the ceramic particles mixed with a resin binder are used in the porous layer which is coated onto a porous separator substrate. Similar to the conventional technology, the ceramic particles in Baba et al. are additives for the slurry to coat onto the separator for solving certain problems. Referring to the specification of Baba et al., the PI and the derivatives thereof are exerted mainly for improving the high-temperature charge performance in the situation of keeping a large capacity and a high energy density at the same time. Although the PI and the derivatives thereof are disclosed in Baba et al., according to the specification of Baba et al., obviously the functions of the PI and the derivatives thereof are not to solve the poor ionic conductivity and/or bad electrical isolation which are all the main issues disclosed in the present invention.

SUMMARY OF THE INVENTION

It is an objective of this invention to provide an electricity supply element and the ceramic separator thereof. The ceramic separator is made of ceramic particulates and the adhesive. The adhesive employs dual binder system, which includes linear polymer and cross-linking polymer. The adhesion and heat tolerance are enhanced by the characteristic of the two type of polymers. Therefore, the adhesive can stand at high-temperature without melting during the process of removing the absorbed water from the ceramic particulates. The ceramic separator would not be cracked and the holes, ion-migration paths, between the two electrode layers would be maintained during high operation temperature. Also, the ceramic separator enhances the ion conductivity, reduces the possibility of the micro-short and increases practical utilization. Moreover, by the dual binder system, a higher percentage of the ceramic particulates is obtained. The structure and the distribution of the holes, formed by the ceramic particulates and the dual binder system thereon, is optimized to promote a better balance between of the electrical insulation and the ionic conductivity. Therefore, the electric property of the electricity supply element is improved.

It is another objective of the present invention to provide an electricity supply element and the ceramic separator thereof. The adhesive includes the linear polymer and the cross-linking polymer to be with both characteristics of adhesion and ion-migration path. A higher percentage of the ceramic particulates is obtained to improve the heat tolerance.

In order to implement the abovementioned, this invention discloses an electricity supply element and the ceramic separator thereof. The electricity supply element includes a first electrode substrate, a second electrode substrate and a ceramic separator. The first electrode substrate includes a first current collector layer and a first active material layer, and the second electrode substrate includes a second current collector layer and a second active material layer. The ceramic separator is disposed between the first electrode substrate and the second electrode substrate. The ceramic separator is disposed on the first current collector layer and the second current collector layer, or disposed on the first active material layer and the second active material layer. The ceramic separator is composed of a plurality of ceramic particulates and a dual binder system thereon. The dual binder system includes a linear polymer and a cross-linking polymer. The adhesion for the ceramic particulates is improved to obtain a higher percentage of the ceramic particulates. The ceramic separator is suitable for electrical insulation and ion migration permission. Therefore, the structural strength, the ion conductivity, electrical insulation and the heat tolerance are improved and enhanced.

In another embodiment, the electricity supply element includes a substrate, a first current collector layer, a first active material layer, and a second current collector layer, a second active material layer. The substrate includes a plurality of holes, which are filled with a plurality of ceramic particulates and a dual binder system thereon. The dual binder system includes a linear polymer and a cross-linking polymer. The first and the second current collector layers are deposed on the two opposite sides of the substrate and have holes according to the holes of the substrate. The active material layers are disposed on the outer side of the current collector layers respectively. Therefore, the substrate is served as a separator to permit ion migration between the first active material layer and the second active material layer. The electric charge is outputted through the current collector layers which disposed on the substrate.

The ceramic separator of this invention is electrically and electrochemically inactive and composed of a plurality of ceramic particulates and a dual binder system thereon. The dual binder system includes a linear polymer and a cross-linking polymer, and the dual binder system includes about 0.01 to about 60 percent by weight of the cross-linking polymer.

The cross-linking polymer may be a cross-linking polymer with network structure, such as epoxy resin, acrylic acid resin, polyacrylonitrile (PAN) or combinations thereof. The cross-linking polymer also may be a cross-linking polymer with ladder structure, such as polyimide (PI) and the derivatives thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
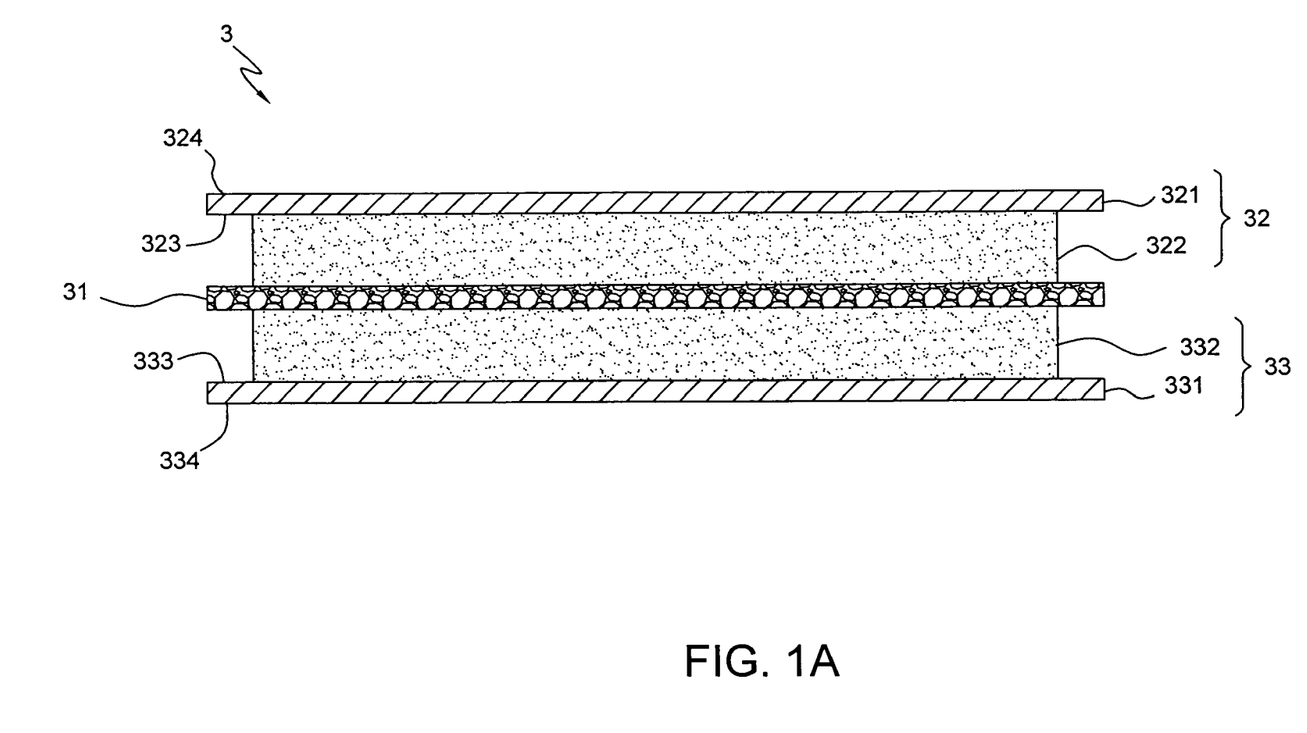
FIGS. 1A and 1B illustrate the cross-sectional views of the electricity supply element of this invention.
Figure 1B:
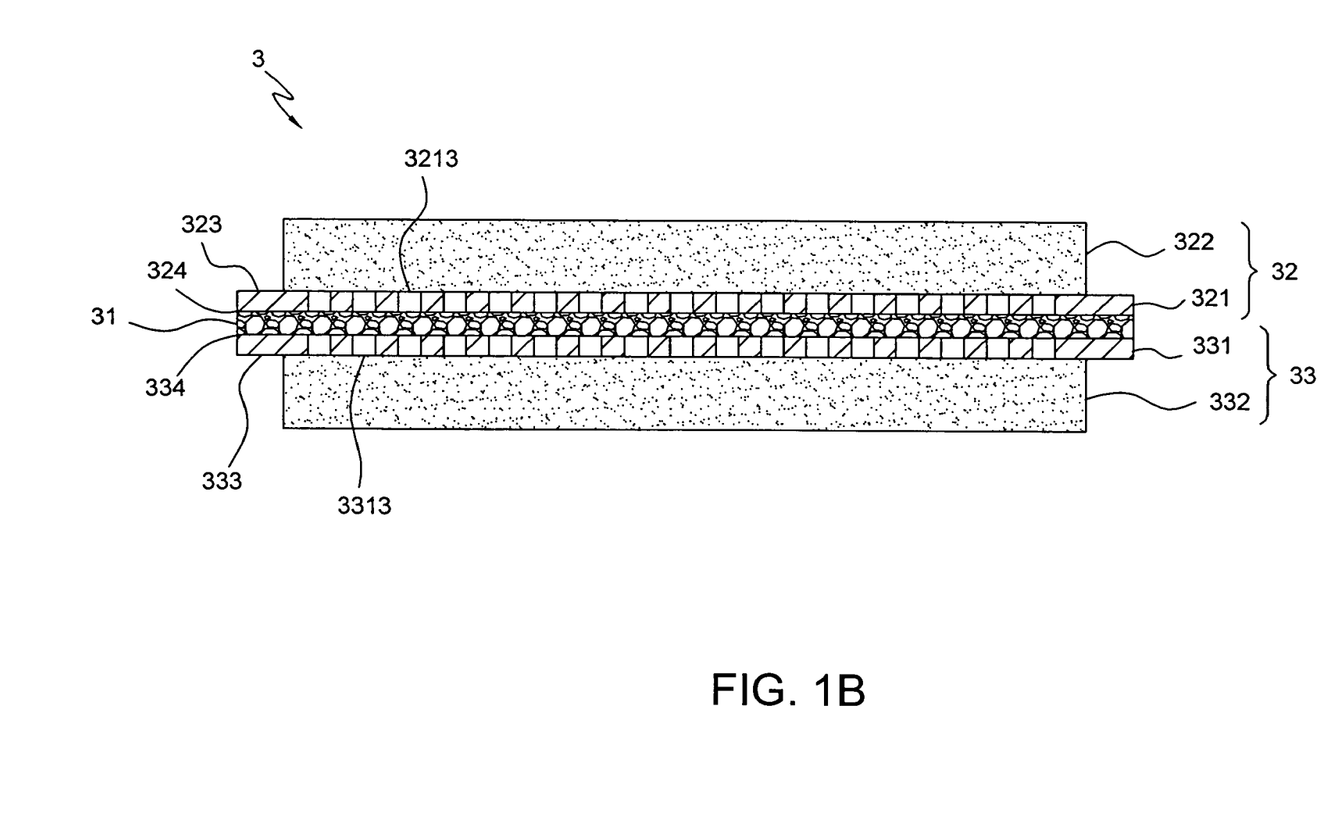

FIGS. 1A and 1B illustrate the cross-sectional views of the electricity supply element of this invention. The electricity supply element 3 includes a first electrode substrate 32, a second electrode substrate 33 and a ceramic separator 31. The first electrode substrate 32 includes a first current collector layer 321 and a first active material layer 322. The first current collector layer 321 has a first surface 323 and an opposed second surface 324. The first active material layer 322 is disposed on the first surface 323 of the first current collector layer 321. The second electrode substrate 33 includes a second current collector layer 331 and a second active material layer 332. The second current collector layer 331 has a first surface 333 and an opposed second surface 334. The second active material layer 332 is disposed on the first surface 333 of the second current collector layer 331.

The ceramic separator 31 is disposed between the first electrode substrate 32 and the second electrode substrate 33. The ceramic separator 31 may be disposed on the first active material layer 322 and the second active material layer 332, see FIG. 1A, or disposed on the second surface 324 of the first current collector layer 321 and the second surface 334 of the second current collector layer 331, see FIG. 1B.

The ceramic separator 31 is composed of a plurality of ceramic particulates and a dual binder system served as an adhesive to bind thereon. The dual binder system includes a linear polymer and a cross-linking polymer. The dual binder system includes about 0.01 to about 60 percent by weight of the cross-linking polymer. The ceramic particulates include $TiO_2$, $Al_2O_3$, $SiO_2$ with nanometer and micrometer scale, or alkylated ceramic particulates, alkaline earth metal phosphate, alkaline metal phosphate, alkaline earth metal carbonate, alkaline earth carbonate and combinations thereof.

The adhesion for the ceramic particulates is improved to obtain a higher percentage of the ceramic particulates. The ceramic separator is suitable for insulation electrically and to permit ion migration. Therefore, the structural strength, the ion conductivity, electrical insulation and the heat tolerance are improved and enhanced. The linear polymer of the dual binder system may be Polyvinylidene fluoride (PVDF), polyvinylidene fluoride co-hexafluoropropylene (PVDF-HFP), Polytetrafluoroethene (PTFE), polymethylacrylate, polyacrylamide, and combinations thereof.

The ceramic particulates is the main material of the ceramic separator 31, so that the structural strength of the ceramic separator 31 is high enough to support the first electrode substrate 32 and/or the second electrode substrate 33. The ceramic separator 31 is electrically and electrochemically inactive. Also, the ceramic separator 31 is electrical insulating to isolate electrically the first electrode substrate 32 and the second electrode substrate 33. Furthermore, the adhesive utilizes the dual binder system, which includes the linear polymer and the cross-linking polymer. The cross-linking polymer is with higher adhesion strength. Cooperating with the linear polymer, the rigidity of the adhesive structure would not be so high as to prevent the structure to break easily. Therefore, the first electrode substrate 32 and the second electrode substrate 33 are bonded firmly to achieve the stability and safety of the electricity supply element 3.

Moreover, by the dual binder system, a higher percentage of the ceramic particulates is obtained, more than 60% or even up to 90%. The thermal stability and the heat tolerance are enhanced. Also, the structure and the distribution of the holes, formed by packing of the ceramic particulates, is optimized. And the barriers to block the ion migration are decreased due to the percentage of the adhesive is lower. Therefore, the ionic conductivity is improved.

The cross-linking polymer of the dual binder system may be a cross-linking polymer with network structure, such as epoxy resin, acrylic acid resin, polyacrylonitrile (PAN) and combinations thereof. Their own network cross-linking structure is dense structure. Even cooperating with the linear polymer, the distribution of the holes is inadequate for ion migration. Also, the amount/volume of solid barriers would be increased accordingly. Therefore, the ionic conductivity of this structure is moderately less than the ionic conductivity of the conventional separator (film). However, the possibility and amount of existence of the huge holes are reduced, and the electrical insulation is improved.

Therefore, the cross-linking polymer of the dual binder system may be a cross-linking polymer with ladder structure, such as polyimide (PI) and the derivatives thereof. Cooperating with the linear polymer, the distribution of the holes of the ceramic separator 31 is very well for ion migration. And the amount/volume of solid barriers would be much decreased accordingly. The distribution of the holes is even better than the separator using only linear polymer as adhesive. Therefore, the ionic conductivity of this structure is better than the ionic conductivity of the conventional separator (film). Also, the ladder cross-linking polymer, such as PI, is an electrically inactive material to promote a better balance of the electrically inactive and the ionic conductivity.

On the other hand, the ceramic separator 31 is formed on the electrode layers. After curing process, the possibility of the huge holes existed at the interfaces caused by removing the solvent is reduced due to the cross-linking polymer structure. The electrical insulation is maintained and the possibility of the micro-short is reduced. Also, the cross-linking polymer structure is with high thermal stability to stand at high-temperature without melting during the process of removing the absorbed water from the ceramic particulate's surface. The cross-linking polymer structure also can stand the heat generated during charge or discharge process to maintain the respective position of the first electrode substrate 32 and the second electrode substrate 33 to improve the stability, safety, and battery performance of the electricity supply element 3.

Please refer to FIG. 1B, to permit ion migration between the first electrode substrate 32 and the second electrode substrate 33, the first current collector layer 321 has a plurality of holes 3213 and the second current collector layer 331 has a plurality of holes 3313. The electrolyte impregnated into the first active material layer 322 and the second active material layer 332. The electrolyte is a solid electrolyte, a liquid electrolyte, or a gelled electrolyte. Also, because of the wettability of the ceramic material is good, the distribution of the electrolyte is very well.

Figure 2:
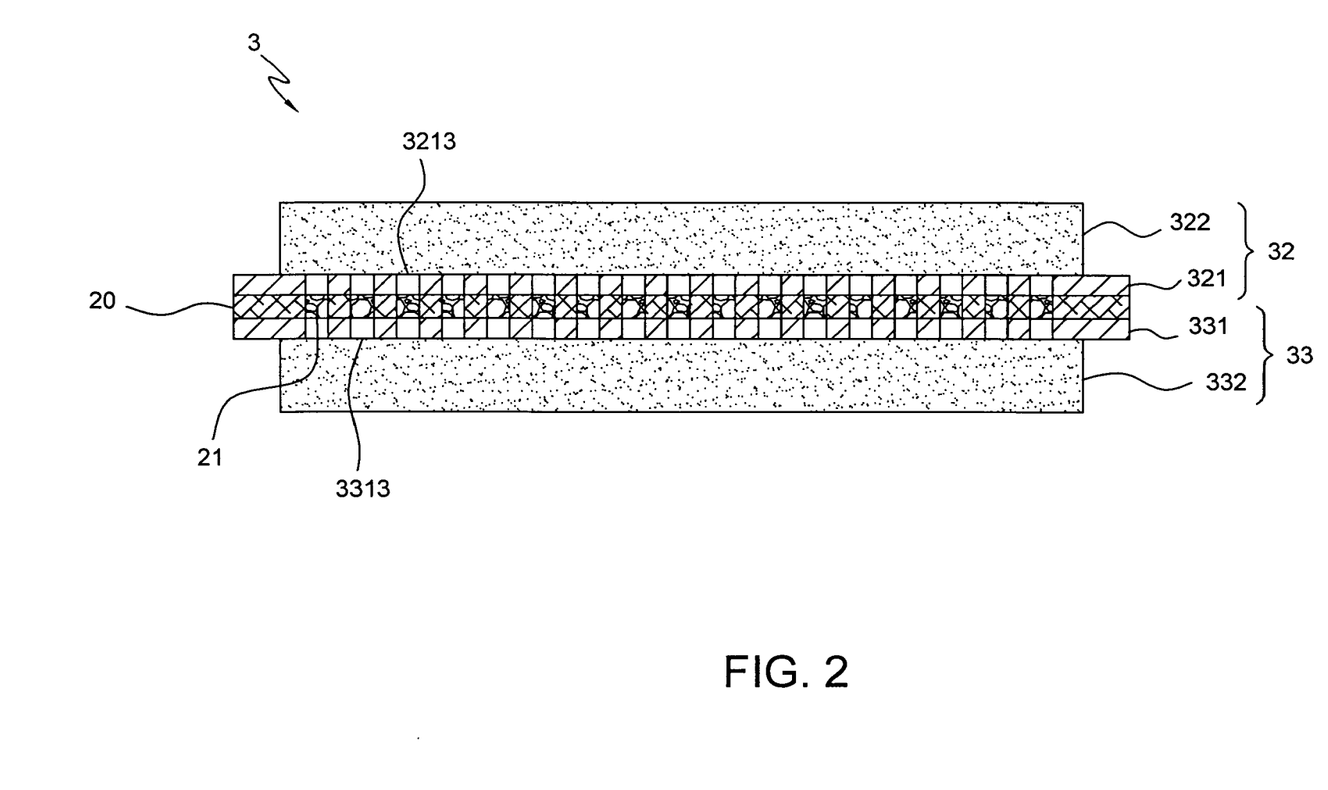
FIG. 2 illustrates the cross-sectional view of other embodiment of the electricity supply element of this invention.

As shown in FIG. 2, in this embodiment, the ceramic separator 31 is replaced by a substrate 20, comparing to FIG. 1B. The substrate 20 includes a plurality of holes 21 according to the holes 3213, 3313 of the first current collector layer 321 and the second current collector layer 331. Due to the first current collector layer 321, the substrate 20 and the second current collector layer 331 have the holes 3213, 21 and 3313, the electrolyte is easier to impregnate into therein.

The substrate 20 is a flexible circuit board or a rigid circuit board. As refer to FIG. 2, the first current collector layer 321 and the second current collector layer 331 are disposed on the substrate 20. Therefore, a logic circuit area may be formed by extending from the substrate 20 to output electricity directly to the outside circuit/load directly. The material of the substrate 20 is insulating materials, includes polyimide (PI), polyethylene terephthalate (PET), polyethylene naphthalate (PEN), glass fiber, and liquid crystal polymer, or the combination thereof. The substrate 20 has the holes 21 to permit ion migration. The holes 21 are formed by through holes, ant holes (non-through holes), or porous material, and filled with a plurality of ceramic particulates and a dual binder system served as an adhesive to bind thereon. The dual binder system also includes a linear polymer and a cross-linking polymer. As above-mentioned, the ionic conductivity of the electricity supply element 3 is improved.

Figure 3:
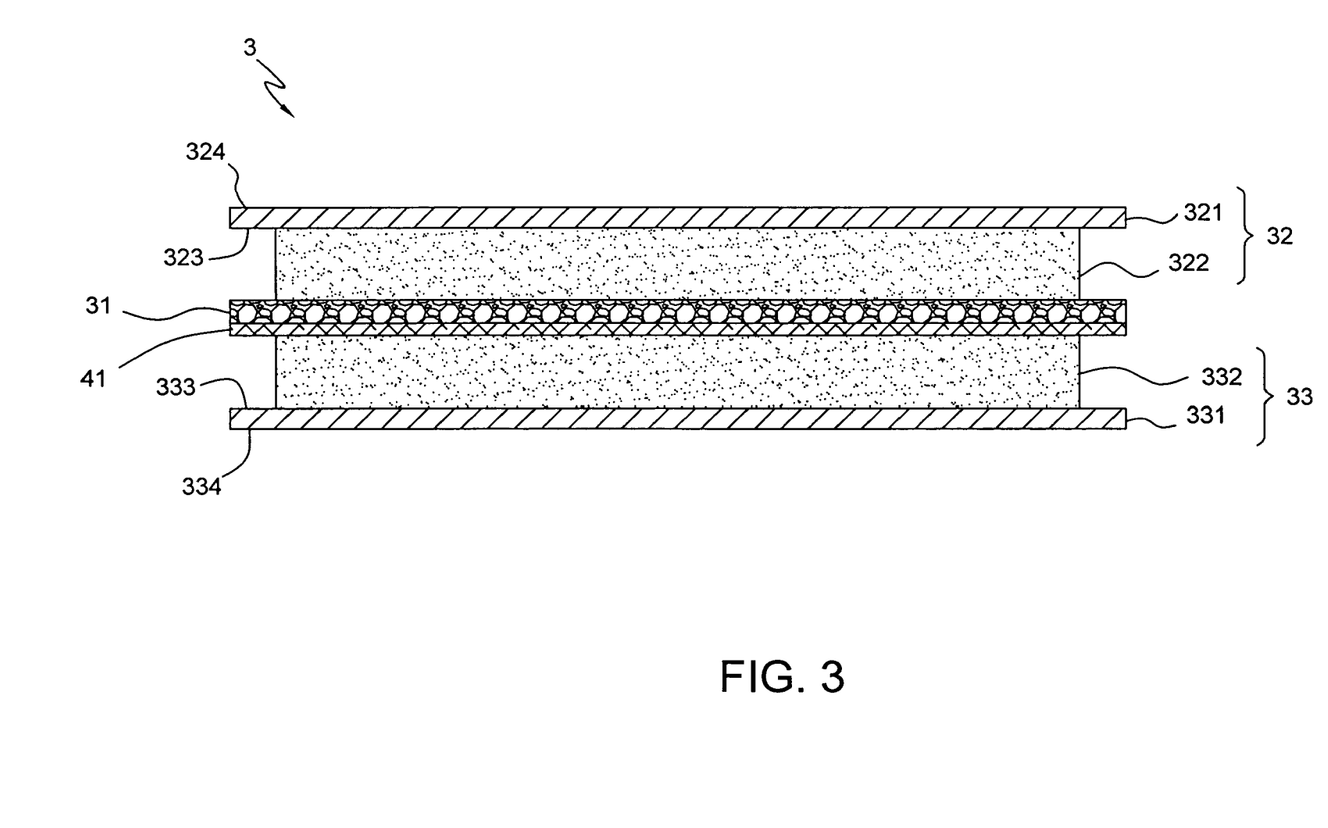
FIG. 3 illustrates the cross-sectional view of another embodiment of the electricity supply element of this invention.
Figure 4A:
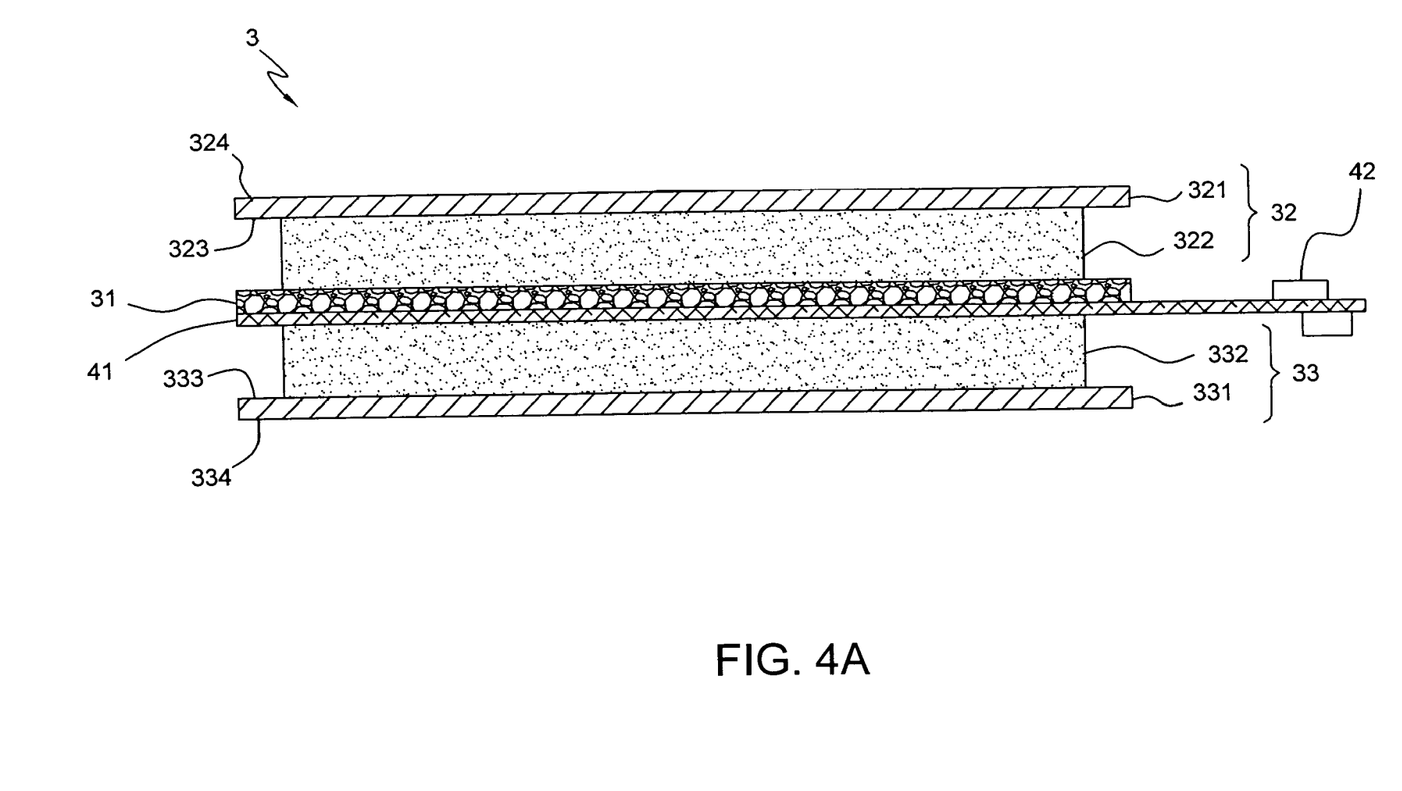
FIGS. 4A and 4B illustrates the cross-sectional views of the electricity supply system of this invention, which further including a separator film.
Figure 4B:
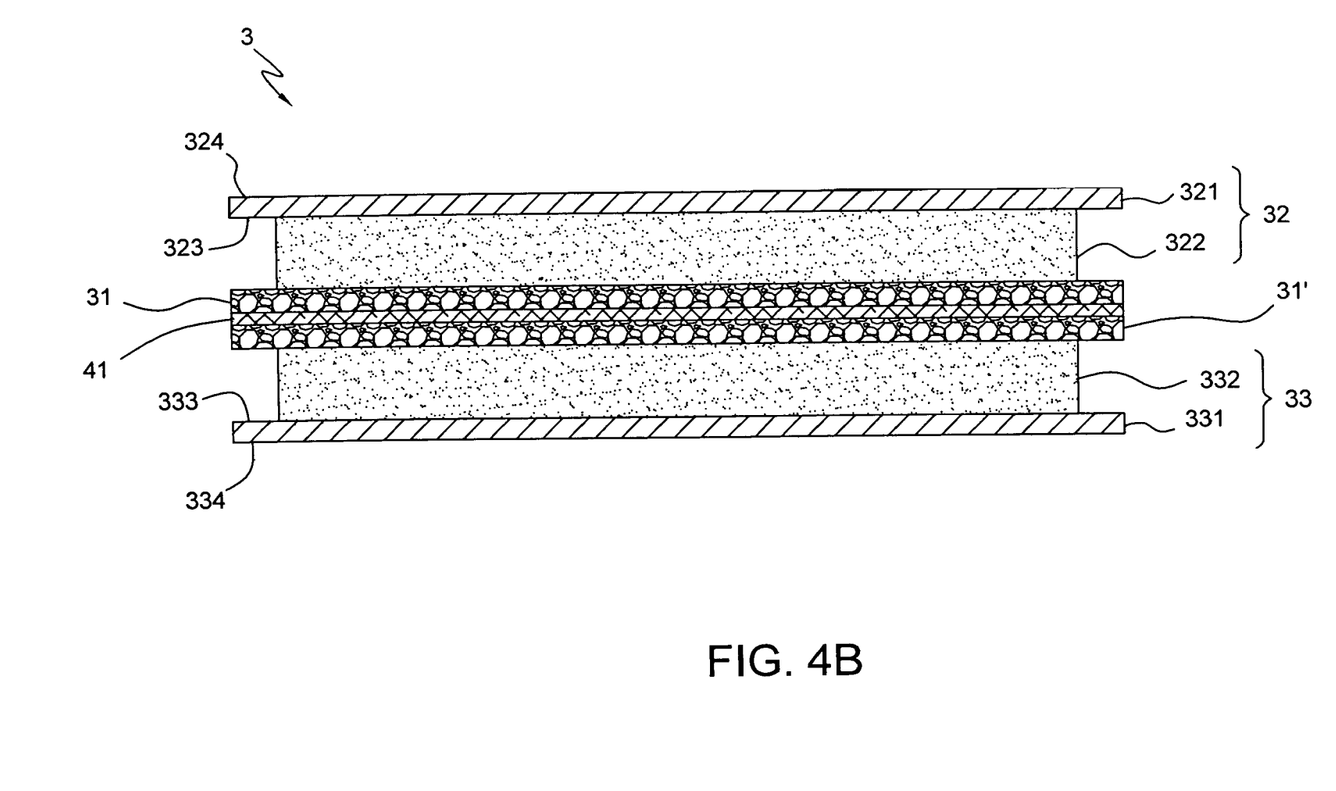

Please refer to FIG. 3, a separator film 41 is disposed on one side of the ceramic separator 31. The material of the separator film 41 is insulating materials, such as polyimide (PI), polyethylene terephthalate (PET), polyethylene naphthalate (PEN), glass fiber, and liquid crystal polymer, or the combination thereof. Also, please see FIG. 4A, the separator film 41 extends outside the ceramic separator 31 for carry at least one electric component 42 thereon. Moreover, another ceramic separator 31' may be disposed on another side of the separator film 41, please see FIG. 4B.

In the above-mentioned embodiments of the electricity supply element 3, any conventional package method may be used to pack.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electricity supply element, comprising:
a first electrode substrate, including a first current collector layer and a first active material layer, wherein the first current collector layer includes a first surface and a second surface opposed each other, the first active material layer is disposed on the first surface of the first current collector layer;
a second electrode substrate, including a second current collector layer and a second active material layer, wherein the second current collector layer includes a first surface and a second surface opposed each other, the second active material layer is disposed on the first surface of the second current collector layer; and
a ceramic separator, disposed between the first electrode substrate and the second electrode substrate and composed of a plurality of ceramic particulates and a dual binder system thereon, wherein the percentage of the ceramic particulates by the dual binder system is more than 60% and the dual binder system includes a linear polymer and a cross-linking polymer;
wherein the cross-linking polymer of the dual binder system is a ladder cross-linking polymer with ladder structure, including polyimide (PI) and the derivatives thereof, so that the ladder cross-linking polymer promotes a balance of an electrical inactivity and an ionic conductivity due to the ladder cross-linking polymer is an electrically inactive material.

2. The electricity supply element of claim 1, wherein the ceramic particulates comprise $TiO_2$, $Al_2O_3$, $SiO_2$ with nanometer and micrometer scale, or alkylated ceramic particulates, alkaline earth metal phosphate, alkaline metal phosphate, alkaline earth metal carbonate, alkaline earth carbonate and combinations thereof.

3. The electricity supply element of claim 1, wherein the linear polymer of the dual binder system is selected from the group consisting of Polyvinylidene fluoride (PVDF), polyvinylidene fluoride co-hexafluoropropylene (PVDF-HFP), Polytetrafluoroethene (PTFE), polymethylacrylate, polyacrylamide and combinations thereof.

4. The electricity supply element of claim 1, wherein the dual binder system comprises about 0.01 to about 60 percent by weight of the polyimide.

5. The electricity supply element of claim 1, wherein the ceramic separator is disposed on the second surface of the first current collector layer of the first electrode substrate and the second surface of the second current collector layer of the second electrode substrate.

6. The electricity supply element of claim 5, wherein the first current collector layer and the second current collector layer include a plurality of holes to permit an ion migration between the first active material layer and the second active material layer.

7. The electricity supply element of claim 1, wherein the ceramic separator is disposed on the first active material layer of the first electrode substrate and the second active material layer of the second electrode substrate.

8. A ceramic separator, being electrically and electrochemically inactive, characterized in that the ceramic separator is composed of a plurality of ceramic particulates and a dual binder system thereon, wherein the percentage of the ceramic particulates by the dual binder system is more than 60% and the dual binder system includes a linear polymer and a cross-linking polymer, and the dual binder system comprises about 0.01 to about 60 percent by weight of the cross-linking polymer, wherein the cross-linking polymer of the dual binder system is a cross-linking polymer with ladder structure, including polyimide (PI) and the derivatives thereof, so that the ladder cross-linking polymer promotes a balance of an electrical inactivity and an ionic conductivity due to the ladder cross-linking polymer is an electrically inactive material.

9. The ceramic separator of claim 8, wherein the ceramic particulates comprise $TiO_2$, $Al_2O_3$, $SiO_2$ with nanometer and micrometer scale, or alkylated ceramic particulates, alkaline earth metal phosphate, alkaline metal phosphate, alkaline earth metal carbonate, alkaline earth carbonate and combinations thereof.

10. The ceramic separator of claim 8, wherein the linear polymer of the dual binder system is selected from the group consisting of Polyvinylidene fluoride (PVDF), polyvinylidene fluoride co-hexafluoropropylene (PVDF-HFP), Polytetrafluoroethene (PTFE), polymethylacrylate, polyacrylamide and combinations thereof.

* * * * *